UNITED STATES PATENT OFFICE.

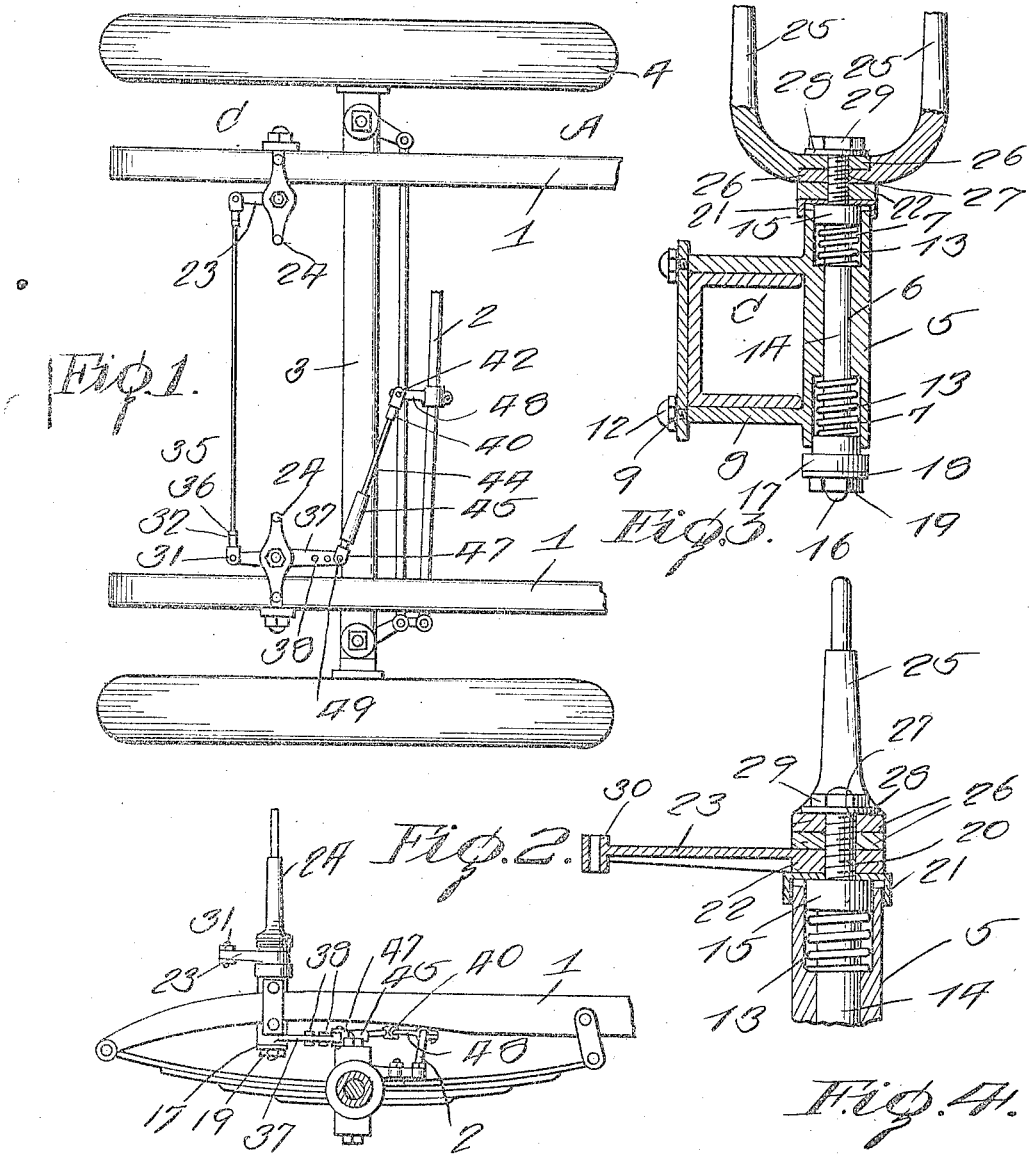

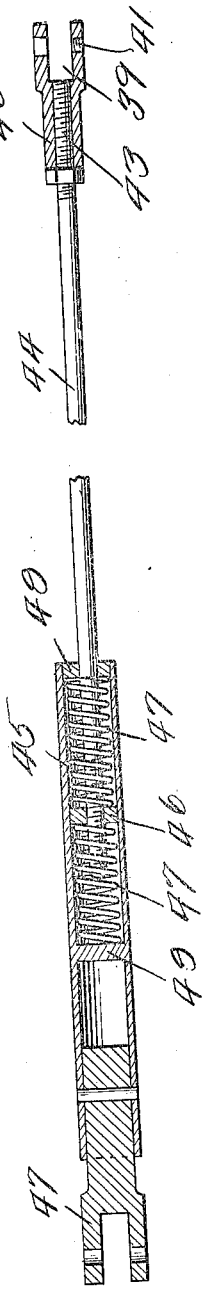
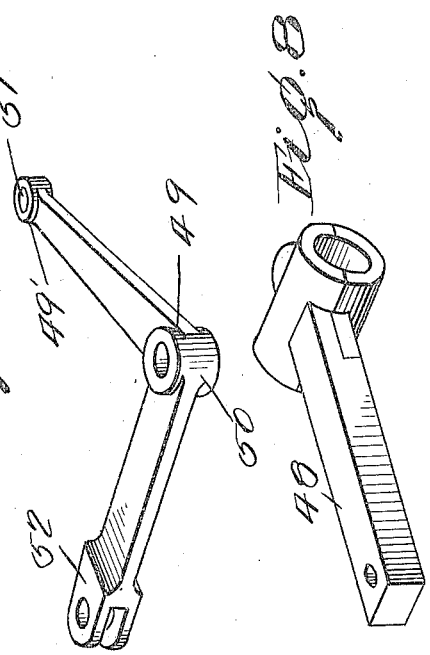
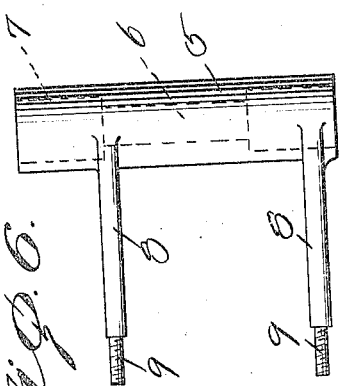

BERT MACE HUFF, OF LA FAYETTE, INDIANA.

DIRIGIBLE HEADLIGHT.

1,190,413.  Specification of Letters Patent.  Patented July 11, 1916.

Application filed January 21, 1914. Serial No. 813,538.

*To all whom it may concern:*

Be it known that I, BERT MACE HUFF, a citizen of the United States, residing at La Fayette, in the county of Tippecanoe, State of Indiana, have invented certain new and useful Improvements in Dirigible Headlights; and I do hereby declare the following to be a full, clear, and exact description of the invention, such as will enable others skilled in the art to which it appertains to make and use the same.

The present invention relates to certain novel and useful improvements in dirigible headlights for automobiles and other vehicles, and has particular application to mechanism whereby the lamps of the vehicle will be turned in the direction of travel of the latter simultaneously with the turning of the front or steering wheels.

In carrying out my invention it is my purpose to provide mechanism whereby the lamp or lamps, which in the practice of my invention, are located at the front of the vehicle, may be controlled from the steering devices of the vehicle so that no matter in what direction the front wheels of the vehicle may be turned the lamp or lamps will be simultaneously turned in the same direction.

Still a further object of my invention is the provision of a device of the class described which will embody in its construction the desired features of simplicity, efficiency, reliability and convenience.

With the above recited objects and others of a similar nature in view, my invention consists in the construction, combination and arrangement of parts set forth in and falling within the scope of the appended claim.

In the accompanying drawing, Figure 1 is a top plan view of a portion of a motor vehicle having my invention applied thereto. Fig. 2 is a view in side elevation of the structure shown in Fig. 1. Fig. 3 is a vertical longitudinal sectional view taken through one of the clamps and the lamp yoke or bracket carried thereby. Fig. 4 is a detail view partly in elevation and partly in section of one of the lamp supporting posts and its connected parts. Fig. 5 is a detail view partly in section and partly in elevation of the connecting rod between one of the lamp supporting posts and the steering rod of the vehicle. Fig. 6 is a detail view of one of the clamps for securing one of lamp posts to the frame of the vehicle. Fig. 7 is a detail view of the clamp employed with steering mechanism embodying steering rods extending parallel with the longitudinal channel irons of the vehicle frame. Fig. 8 is a detail view of the angular lever employed in connection with vehicles provided with transverse steering rods.

Referring now to the accompanying drawings in detail, the letter A designates as an entirety a portion of the frame of the vehicle, including the longitudinal bars 1—1, while 2 designates a steering rod extending transversely of the frame and 3 indicates the axle of the vehicle carrying the usual wheels 4.

In order to mount the lamps upon the frame of the vehicle, I provide a pair of clamps, each indicated by the letter C, one clamp being secured to the forward portion of each rod 1. Each clamp C comprises a sleeve 5 having a reduced central bore 6 and enlarged end bores 7 communicating with the central bore 6. Parallel spaced arms 8—8 are carried by the sleeve, these arms being adapted to span the bar 1 to the frame, the ends of the arms being reduced and threaded as at 9, while 10 designates a plate having apertures 11 through which the reduced ends 9 are passed, these nuts receiving the cap nuts 12. From this it will be noted that each clamp is secured in position upon its bar 1 by means of its plate and cap nut.

Seated within each of the end bores 7 of each sleeve 5 is a section of coil spring 13 adapted to cushion the post 14 when the latter is inserted through the sleeve. There are of course two of these posts, one for each lamp, and as these posts and their coöperating parts are substantially similar in construction, a description of one will suffice for both. Each post 14 is formed at its upper end with a collar 15 which when the post is inserted in its sleeve 5 will bear upon the adjacent coil spring 13. The lower end of each post terminates in a reduced threaded stud 16 adapted to receive the collar nut 17, and the washer 18, all being secured in position by means of the nut 19 threaded onto the terminal of the stud 16. From this it will be seen that the post 14 is free to turn in the sleeve 5 and is also cushioned so that any jar caused by the vibrations of the vehicle will be reduced. The upper end of each post 14 is provided with a relatively long threaded shank 20 upon which is fit a cap nut which when in position fits over the top end of the sleeve 5. Threaded on the shank 20 and overlying a cap 21 is a plate 22 from which extends an arm 23 for the purpose herein described, and as will be seen by reference to the drawings the two arms 23, which are employed, project rearward. Superimposed upon each plate 22 is the lamp bracket or yoke 24 formed of the two sections 25—25, the lower horizontal sections 26—26 of which are provided with alining openings 27 through which the shank 20 projects. A washer 28 and a nut 29 are placed upon the end of the shank 20 and secure all the parts together.

As above stated, the arms 23 project inward from their respective sides of the vehicle frame and extend rearward and in order to connect these arms I provide the inner end of each arm with a short vertical sleeve 30 which is spanned by the bifurcated end 31 of the adjacent sleeve rod 32, a bolt 33 fastening the sleeve rod at the sleeve 30. Each sleeve rod 32 has threaded therein the adjacent end of the connecting rod 35, a nut 36 being employed for fastening each end of the rod. By this arrangement it is seen that the revolving supporting mechanism of each lamp L is connected with the revolving supporting mechanism of the other lamp, so that when one lamp is turned as herein described, the other lamp will be simultaneously turned in the same direction.

In order to operate the lamps from the steering rod of the vehicle I provide the following mechanism: Extending from one of the collar nuts 17 is an arm 37, the free end of which is provided with a series of short spaced sleeves 38 which are designed to be optionally placed within the bifurcated end 39 of the short sleeve rod 40, the bore of each sleeve 38 alining with the bores 41 of the bifurcated portion 39, so that the arm 37 may be connected with the sleeve rod 40 by means of the pin 42 passing through such alining bores. This sleeve rod 40 is designed to receive the threaded end 43 of the rod 44, the opposite end of said rod extending into the tubular rod 45 and is threaded into the nut 46. At each side of the nut 46 is arranged a coil buffer spring 47, the outer ends of said springs bearing against the stop blocks 48. By this it will be seen that while a certain amount of relative movement is permitted between the rod 44 and the tubular rod section 45, such movement is cushioned and limited by the springs. The opposite end of the tubular rod 45 from that into which the rod 44 projects is adapted to receive the shank 46' of the fork 47'. This fork 47' is designed to be connected by means of the arm 48 with the steering rod of the vehicle. From this it will be seen that the different parts just described as extending between the arm 37 and the spring rod 2 in reality constitute a rod by means of which one of the lamps may be turned when the steering rod is operated. If desired, the connection between the arm 37 and the steering rod might be made in the form of a single rod, but for general purposes, I prefer to construct it as above described. Furthermore I have so designed this operating connection between the steering rod and one of the lamp posts that it may be used on two types of cars, one type being that wherein the steering rods run parallel with the frame and the other type being that wherein the steering rods run transversely of the car immediately back of the front axle. In the later type of steering rod, which is conveniently shown in Fig. 1, I show the fork 47' adapted to be connected by means of the arm 48 with the transverse steering rod 2. For the type of steering rod which runs parallel with the frame or longitudinally of the car, I provide an angular lever 49, shown in Fig. 7, this angular lever being pivotally connected to the frame of the car at its heel portion 50. The lever is adapted to be connected at its end 51 to the fork 47' by means of a suitable bolt or the like, and is adapted to be connected at its opposite end 52 to the arm 48 by means of a bolt. It is to be understood that the arm 48 which is clamped to the steering rod is also used in connection with the angular lever 49 shown in Fig. 7, when my device is applied to a car having longitudinal steering rods.

From the above description taken in connection with the accompanying drawings, the construction and operation of my invention will be readily apparent. It will be seen that the invention essentially comprises a driving operating rod which is connected to the steering rod of the vehicle and to the support of one of the lamps. Consequently as the steering rod is turned, the operating or driving rod is actuated and the lamp support to which it is connected will also be turned in the same direction as the vehicle is turned and as this lamp support is in turn connected through the rod 35 with its companion lamp at the opposite side of the vehicle, the latter will also be turned simultaneously with the first mentioned lamp.

It will be noted that I have provided an exceedingly simple yet efficient mechanism by which the head lights of the vehicle are made dirigible, so that every turn made by the vehicle will cause a corresponding turning of the lamps, thereby insuring that the way will at all times be lighted and thus obviating the possibility of serious accidents.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claim.

What is claimed as new is:

The combination with a clamp adapted to be secured to one side of the frame of a vehicle, a vertical sleeve carried by said clamp, said sleeve having the ends of its bore enlarged, a post revolubly seated in said sleeve and having collars thereon for slidably engaging in the bores, springs coiled about the ends of the post and seated in the enlarged sections of the bore of the sleeve and engaged with the collars and bases of the bores, a lamp bracket mounted to turn with the post, and means adjustably and yieldably connecting the post with the steering mechanism of the vehicle whereby the lamp may be turned in the direction of travel of the vehicle.

In testimony whereof, I affix my signature, in the presence of two witnesses.

BERT MACE HUFF.

Witnesses:
MAURICE J. BIGANE,
AUGUST ADE.

Copies of this patent may be obtained for five cents each, by addressing the "Commissioner of Patents, Washington, D. C."